United States Patent
Harshbarger et al.

(10) Patent No.: US 10,392,876 B2
(45) Date of Patent: Aug. 27, 2019

(54) OILFIELD HANDLING TOOL EQUIPMENT IDENTIFICATION

(71) Applicant: FORUM US, INC., Houston, TX (US)

(72) Inventors: Chris Harshbarger, Cypress, TX (US); Lawrence E. Childress, II, Lafayette, LA (US)

(73) Assignee: FORUM US, INC., Houston, TX (US)

( * ) Notice: Subject to any disclaimer, the term of this patent is extended or adjusted under 35 U.S.C. 154(b) by 71 days.

(21) Appl. No.: 15/407,775

(22) Filed: Jan. 17, 2017

(65) Prior Publication Data

US 2017/0204686 A1 Jul. 20, 2017

Related U.S. Application Data

(60) Provisional application No. 62/280,055, filed on Jan. 18, 2016.

(51) Int. Cl.
| | |
|---|---|
| *E21B 19/07* | (2006.01) |
| *G06K 19/077* | (2006.01) |
| *E21B 19/00* | (2006.01) |
| *E21B 19/06* | (2006.01) |
| *E21B 19/10* | (2006.01) |
| *G06K 19/07* | (2006.01) |

(52) U.S. Cl.
CPC .............. *E21B 19/07* (2013.01); *E21B 19/00* (2013.01); *E21B 19/06* (2013.01); *E21B 19/10* (2013.01); *G06K 19/0723* (2013.01); *G06K 19/07758* (2013.01)

(58) Field of Classification Search
CPC .......... E21B 19/00; E21B 19/06; E21B 19/07; E21B 19/10; G06K 19/0723; G06K 19/07758
See application file for complete search history.

(56) References Cited

U.S. PATENT DOCUMENTS

| | | | |
|---|---|---|---|
| 5,202,680 A * | 4/1993 | Savage | E21B 17/006 175/40 |
| 5,340,182 A | 8/1994 | Busink et al. | |
| 5,762,279 A | 6/1998 | Horton, III | |
| 6,217,258 B1 | 4/2001 | Yamamoto et al. | |

(Continued)

FOREIGN PATENT DOCUMENTS

| | | |
|---|---|---|
| GB | 2473177 A | 3/2011 |
| GB | 2496637 A | 5/2013 |

(Continued)

OTHER PUBLICATIONS

International Search Report and Written Opinion dated Apr. 13, 2017 for Application No. PCT/US2017/013777.

(Continued)

*Primary Examiner* — James G Sayre

(74) *Attorney, Agent, or Firm* — Patterson & Sheridan, L.L.P.

(57) ABSTRACT

The present disclosure generally relates to elevators and other tools having radio frequency identification (RFID) tags embedded therein to facilitate identification of the elevators. The tools include an RFID tag embedded therein to facilitate identification of the tool. The RFID tag may be disposed in a bore formed in tool, and then optionally covered with a capping material.

22 Claims, 11 Drawing Sheets

(56) References Cited

U.S. PATENT DOCUMENTS

| | | | |
|---|---|---|---|
| 6,480,811 B2 * | 11/2002 | Denny | E21B 17/006 |
| | | | 702/188 |
| 6,763,898 B1 | 7/2004 | Roodenburg et al. | |
| 7,159,654 B2 * | 1/2007 | Ellison | E21B 17/006 |
| | | | 166/250.01 |
| 7,303,021 B2 | 12/2007 | Schats et al. | |
| 7,912,678 B2 | 3/2011 | Denny et al. | |
| 7,997,333 B2 | 8/2011 | Angelle et al. | |
| 8,286,509 B2 | 10/2012 | Igarashi et al. | |
| 8,651,175 B2 | 2/2014 | Fallen | |
| 8,708,052 B2 | 4/2014 | Radi | |
| 9,109,409 B2 * | 8/2015 | Childress, II | E21B 41/0021 |
| 9,372,075 B2 | 6/2016 | Oudovikine | |
| 9,790,750 B1 | 10/2017 | Stoldt et al. | |
| 10,196,866 B2 | 2/2019 | Stoldt et al. | |
| 2003/0156033 A1 * | 8/2003 | Savage | G06K 19/04 |
| | | | 340/572.8 |
| 2005/0230109 A1 * | 10/2005 | Kammann | E21B 17/006 |
| | | | 166/255.1 |
| 2006/0108113 A1 * | 5/2006 | Scott | B01D 33/0376 |
| | | | 166/255.1 |
| 2009/0121895 A1 | 5/2009 | Denny et al. | |
| 2009/0208295 A1 | 8/2009 | Kinert et al. | |
| 2011/0266353 A1 * | 11/2011 | Binmore | G06K 19/07728 |
| | | | 235/492 |
| 2013/0035787 A1 | 2/2013 | Canter | |
| 2013/0104367 A1 | 5/2013 | Childress, II | |
| 2013/0264838 A1 | 10/2013 | Havens et al. | |
| 2013/0340998 A1 | 12/2013 | Flusche | |
| 2014/0202767 A1 | 7/2014 | Feasey | |
| 2015/0122490 A1 | 5/2015 | Greening et al. | |
| 2015/0226022 A1 | 8/2015 | Angelle et al. | |
| 2016/0061022 A1 | 3/2016 | McCoy | |
| 2016/0290073 A1 | 10/2016 | Zheng et al. | |

FOREIGN PATENT DOCUMENTS

| | | |
|---|---|---|
| WO | 2013165943 A2 | 11/2013 |
| WO | 2016148880 A1 | 9/2016 |

OTHER PUBLICATIONS

International Search Report and Written Opinion dated Jan. 29, 2018, corresponding to Application No. PCT/US2017/054432.

Invitation to Pay Additional Fees and, Where Applicable, Protest Fee dated Nov. 24, 2017, corresponding to Application No. PCT/US2017/054432.

* cited by examiner

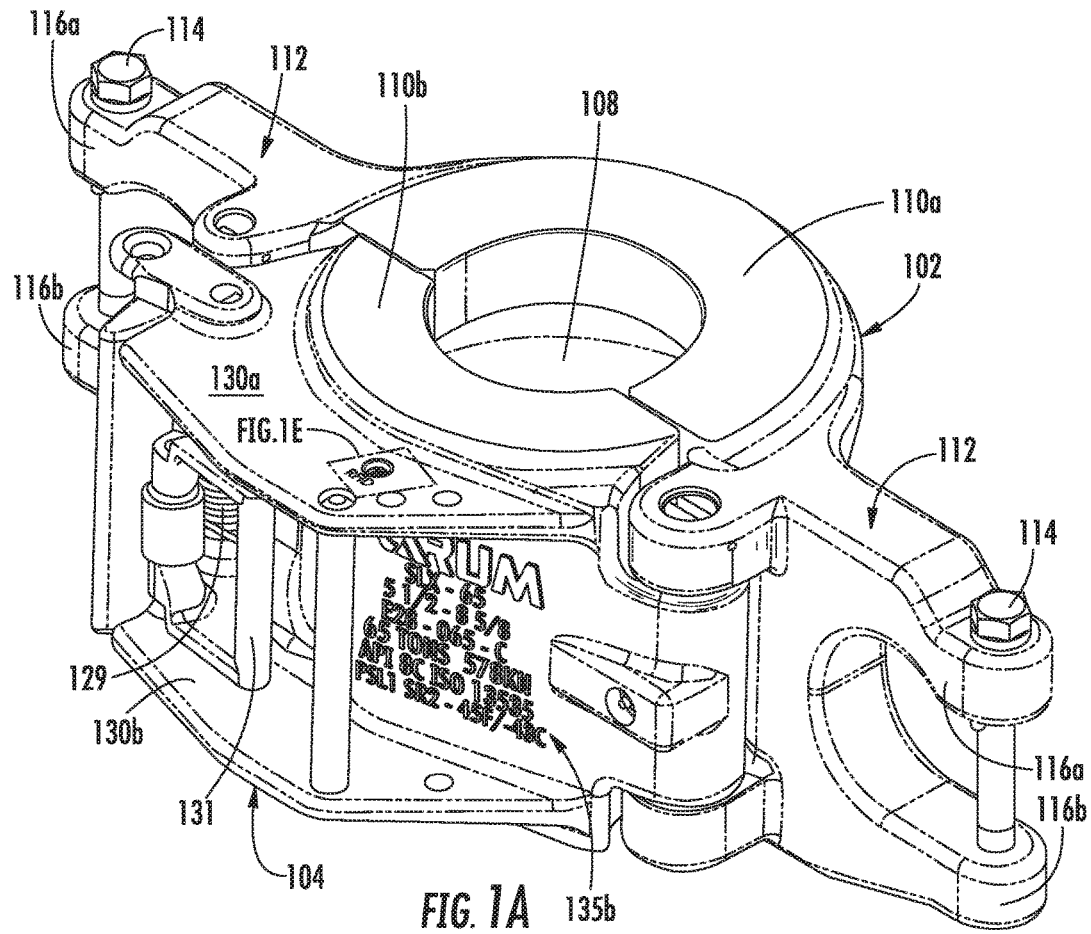
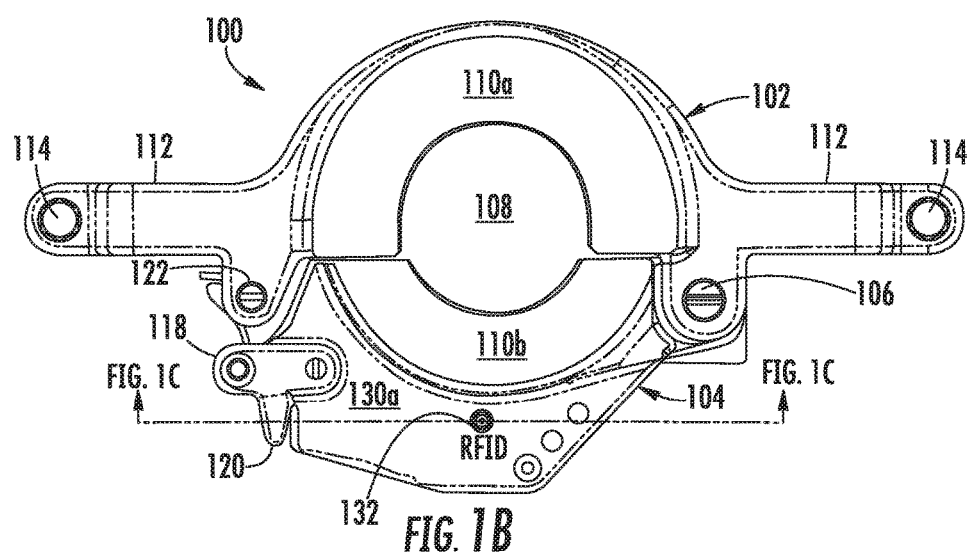

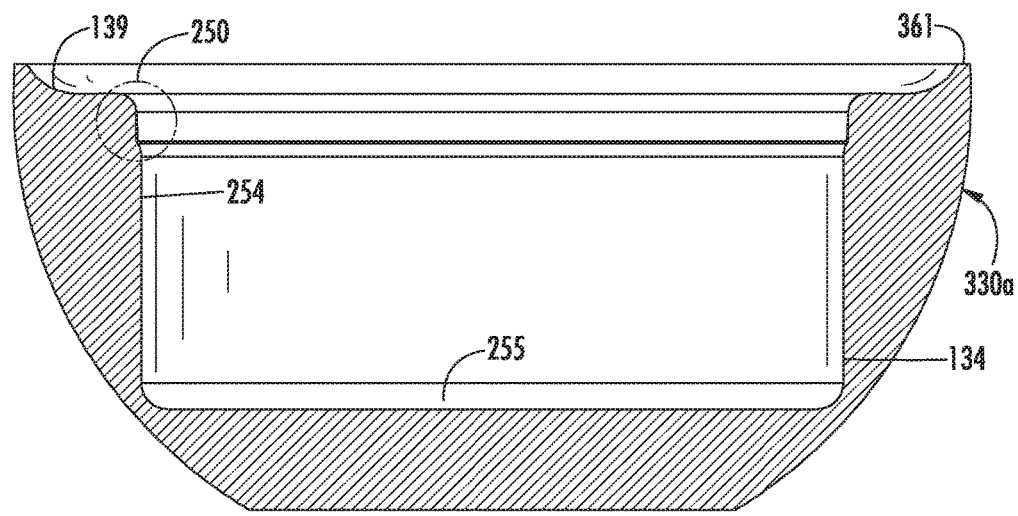
FIG. 3A
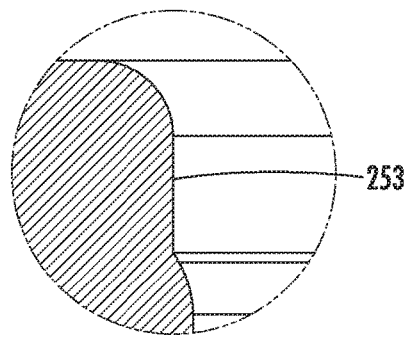
FIG. 3B
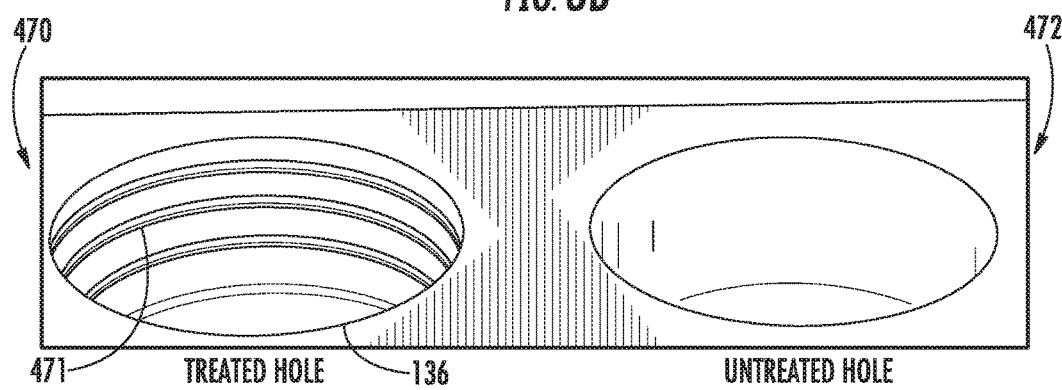
TREATED HOLE
FIG. 4A
UNTREATED HOLE
FIG. 4B

DETAIL A

DETAIL A

OILFIELD HANDLING TOOL EQUIPMENT IDENTIFICATION

CROSS-REFERENCE TO RELATED APPLICATIONS

This application claims benefit of U.S. Provisional Patent Application Ser. No. 62/280,055, filed Jan. 18, 2016, which is herein incorporated by reference.

BACKGROUND

Field

Embodiments of the present disclosure generally relate to wellbore rig elevators, and more particularly, to wellbore rig elevators having radio frequency identification tags embedded therein to facilitate identification of the wellbore rig elevators.

Description of the Related Art

Elevators, as developed for the hydrocarbon industry, are devices which are used to wrap around a tool joint of drill pipe, casing, lift nipples or collars to facilitate the lifting or lowering of the drill pipe, casing, or collar, or of a drill string as a whole.

Each elevator is designed with a precise internal diameter, or a small range of adjustable internal diameters, to facilitate secured engagement with an appropriately profiled shoulder of drill pipe, casing, or collar. Due to the variety of sizes and load ratings of drill pipes, casing, and collars used during drilling operations, many different elevators are required onsite to perform lifting operations. Moreover, several elevators may be kept onsite in the event a spare elevator or elevator of different size, load rating capability and/or link compatibility is needed. While each elevator is labeled with a nameplate to facilitate identification, the nameplate may be damaged, removed, or obscured. Thus, due to the number of elevators onsite and/or the inability to read a nameplate, the identification, locating, or tracking of maintenance schedules of an elevator can be difficult. These imposed difficulties undesirably reduce efficiency at a worksite by requiring additional time to identify or locate an elevator, or to determine an appropriate elevator maintenance schedule.

Therefore, there is a need for wellbore rig elevator which can more easily be identified, located, and/or maintained.

SUMMARY

The present disclosure generally relates to elevators and other tools having radio frequency identification (RFID) tags embedded therein to facilitate identification of the elevators. The tools include an RFID tag embedded therein to facilitate identification of the tool. The RFID tag may be disposed in a bore formed in tool, and then optionally covered with a capping material.

In one embodiment, an elevator comprises a body; a door pivotably mounted to the body, the door and the body defining a cylindrical shape when the door is in a closed position; an upper rib extensions extending from the door; a radio frequency identification tag embedded the upper rib extensions; and a capping material disposed over the radio frequency identification tag.

In another embodiment, a tool comprises a body; a radio frequency identification tag embedded into the body, wherein the radio frequency identification tag is adapted to provide information related to one or more of make, model number, size rating, load rating, link compatibility, maintenance history, time on location, maintenance and/or inspection requirements, and GPS location; and a capping material disposed over the radio frequency identification tag.

In another embodiment, a tool comprises a body of the tool, the tool comprising an elevator, a spider, a master bushing, a bowl, or a slip; a radio frequency identification tag embedded into the body, wherein the radio frequency identification tag is adapted to provide information related to one or more of make, model number, size rating, load rating, link compatibility, maintenance history, time on location, maintenance and/or inspection requirements, and GPS location; and a capping material disposed over the radio frequency identification tag.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and the disclosure may admit to other equally effective embodiments.

FIG. 1A is a schematic perspective view of an elevator, according to one embodiment of the disclosure.

FIG. 1B is a schematic top view of the elevator of FIG. 1A, according to one embodiment of the disclosure.

FIG. 3A illustrates a partial schematic view of an upper rib extension having a bore formed therein, according to another embodiment.

FIG. 3B illustrates an enlarged partial view of FIG. 3A.

FIGS. 4A and 4B illustrate views of a treated bore and an untreated bore, respectively, according to one embodiment of the disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to elevators and other tools having radio frequency identification (RFID) tags embedded therein to facilitate identification of the elevators. The tools include an RFID tag embedded therein to facilitate identification of the tool. The RFID tag may be disposed in a bore formed in tool, and then optionally covered with a capping material.

Figure 1C:
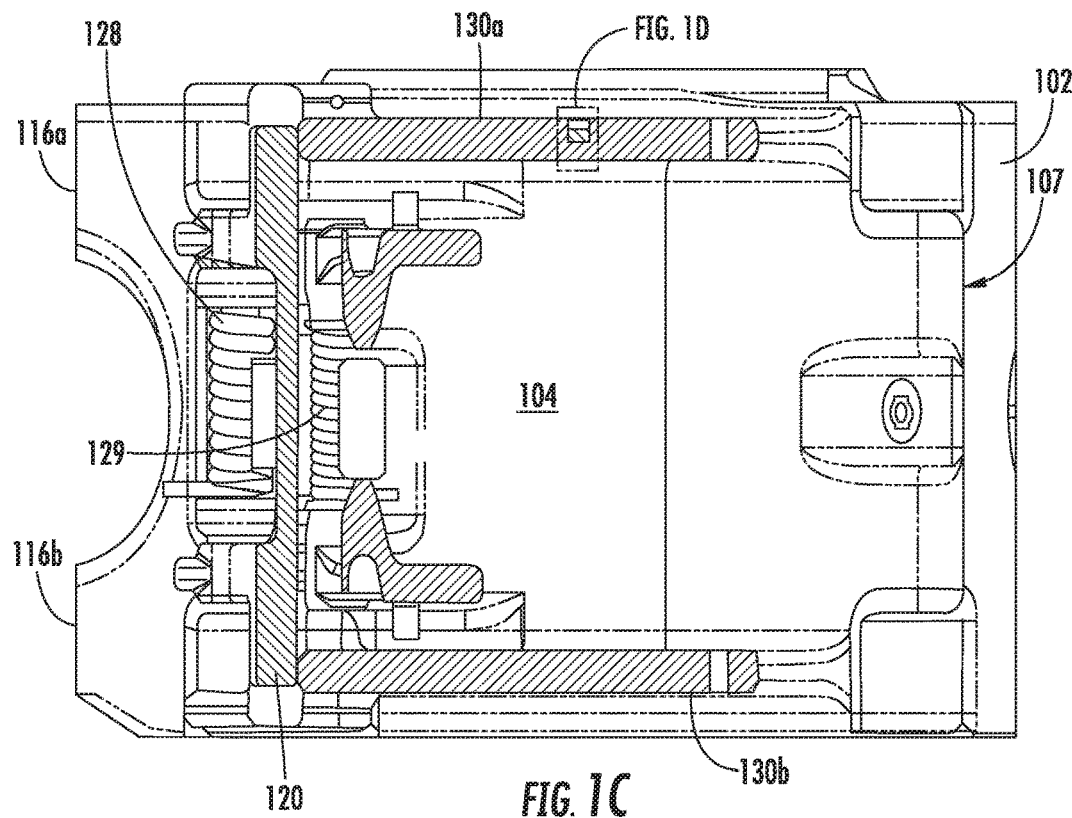
FIG. 1C is a schematic sectional view along line "FIG. 1C-FIG. 1C" of the elevator illustrated in FIG. 1B.
Figure 1D:
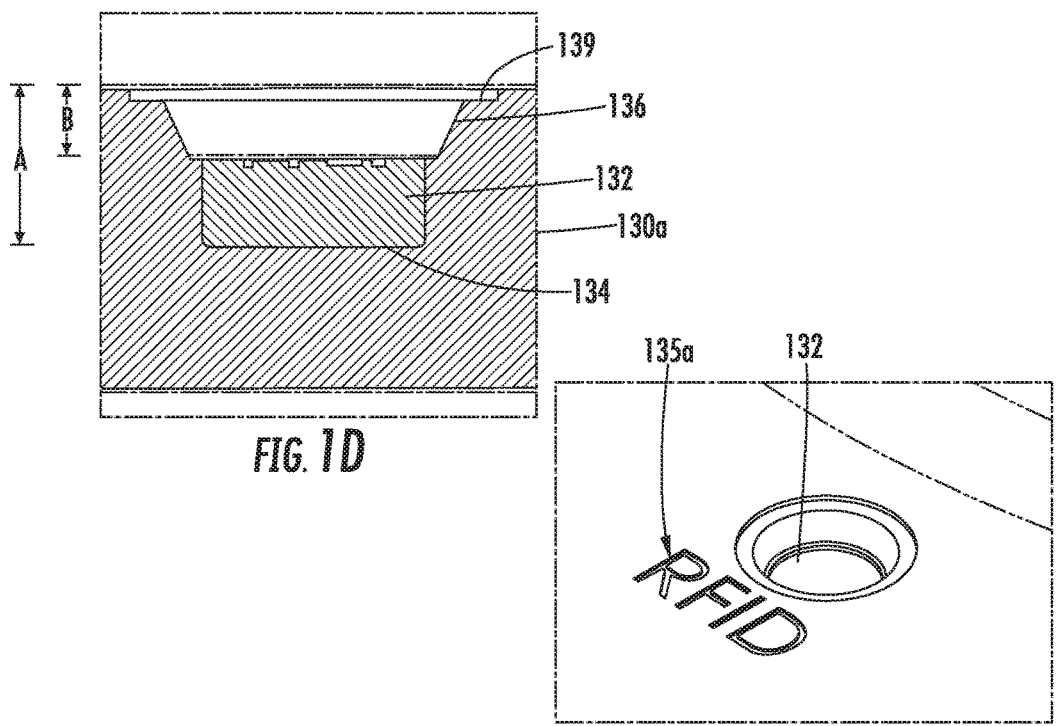
FIG. 1D is an enlarged partial view of FIG. 1C.
Figure 1E:
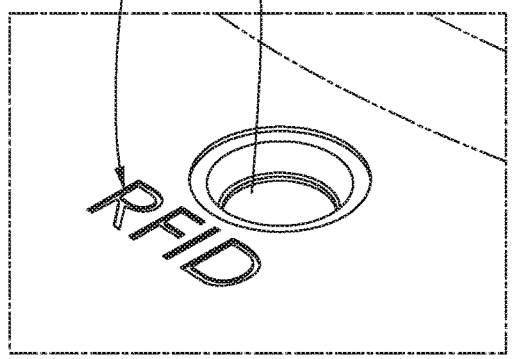
FIG. 1E is an enlarged partial view of FIG. 1A.

FIG. 1A is a schematic perspective view of an elevator 100, according to one embodiment of the disclosure. FIG. 1B is a schematic top view of the elevator 100, according to one embodiment of the disclosure. FIG. 1C is a schematic sectional view along line "FIG. 1C-FIG. 1C" of the elevator 100 illustrated in FIG. 1B. FIG. 1D is an enlarged partial view of FIG. 1C. FIG. 1E is an enlarged partial view of FIG. 1A. To facilitate explanation, FIGS. 1A-1E will be explained in conjunction.

The elevator 100 includes a body 102 and a door 104 configured in a circular arrangement and defining a central opening 108. The door 104 is pivotably coupled to the body 102 via a pin 106 at a hinge 107. The door 104 pivots about an axis of the pin 106 to permit ingress and egress of a tubular (not shown), such as drill pipe, into and out of the central opening 108. Each of the body 102 and the door 104 include respective shoulders 110a, 110b on upper surfaces thereof to engage a profile of the tubular when the elevator 100 supports the tubular during a lifting operation.

The elevator 100 also includes one or more handles 112 (two are shown) extending radially outward from and integrally formed with the body 102. A fastener 114, such as a bolt, is disposed through a radially-outward end of each handle 112 and couples an upper portion 116a of the handle 112 to a lower portion 116b of the handle 112. The bolt may be selectively removed to secure or release a linkage to a respective handle 112.

A locking apparatus 118 is secured to upper and lower rib extensions 130a, 130b of the door 104 opposite the pin 106. The locking apparatus 118 engages a latch 120 coupled to the body 102. The latch 120 pivots about a pin 122 to engage the locking apparatus 118, thereby coupling an outward end of the door 104 to the body 102 and maintaining the elevator in a closed orientation, as shown. The latch 120 may be biased into engagement with the locking apparatus 118 via latch spring 128, and secured by a latch lock spring 129. The latch lock spring 129 is coupled to a handle 131 positioned between the upper and lower rib extensions 130a, 130b of the door 104. Manual actuation of the handle 131 releases the latch lock spring 129, as well as the latch 120 from the locking apparatus 118, thereby allowing opening of the door 104.

The upper and lower rib extensions 130a, 130b extend radially outward from the door 104 and are positioned parallel to one another. The upper rib extension 130a includes an RFID tag 132 embedded in an upper surface thereof to facilitate identification of the elevator 100. Additionally, the upper rib extension 130a may also include a nameplate 135a disposed on an upper surface thereof adjacent the RFID tag 132 to facilitate visual identification of the RFID tag 132 location. A second nameplate 135b may be positioned on the door 104 between the upper and lower rib extensions 130a, 130b. The second nameplate 135b may include identifying information for the elevator 100. The information of nameplate 135b may be information also stored on the RFID tag 132. The information stored on the RFID tag 132 may include one or more of: make, model number, characteristics of the particular elevator 100, maintenance history, time on location, maintenance and/or inspection requirements, and GPS location. Additionally as discussed above, conventional elevators include only a nameplate to assist in identification of the elevator. However, the nameplate is often unreadable, obscured, or missing, and therefore, identification of conventional elevators is difficult and time consuming.

For example, if a nameplate is missing from a conventional elevator, it may be necessary to determine the proper elevator for a specific tubular size, load rating, and/or link compatibility through trial and error, which can be burdensome and introduce human error. In contrast, the elevator 100 of the present disclosure can easily be identified by an RFID tag reader available to equipment operators or other personnel tasked with identifying the elevator 100. Using an RFID tag and associated reader for identification purposes eliminates trial and error identification methods. Example RFID tags include the InfoChip® DuraPlug9.5 UHF. However, it is contemplated that other wireless identification tags may be utilized.

As illustrated in FIGS. 1D and 1E, the RFID tag 132 is positioned in a bore 134 formed in the upper surface of the upper rib extension 130a. A countersink 136 may be formed adjacent to the bore 134. A spot-face 139 may be positioned adjacent the countersink 136 to facilitate formation of the countersink 136 and the bore 134. The spot-face 139 and/or the countersink 136 facilitate repeatable accuracy in machining. The countersink 136, and optionally the spot-face 139, may be filled with capping material (not shown for clarity) to secure the RFID tag 132 within the bore 134. In one example, the capping material may be placed in the countersink 136 until coplanar with the lower surface of the spot-face 139. Suitable capping materials include epoxies, fiberglass, plastic, ceramic, or other materials which suitably protect the RFID tag 132 and allow transmission of identifying information therethrough.

In one example, the bore 134 may be formed to a depth A to seat the RFID tag 132 therein. The depth A may be in a range of about 3 millimeters to about 9 millimeters, such as about 3.5 millimeters. In such an example, the countersink 136 may be formed to a depth B, and the capping material may have a thickness equal to or less than the depth B. In one example, the depth B may be about 2.5 to about 3.5 millimeters, such as about 2.9 millimeters. The composition and thickness of the capping material may be selected to allow for removal of the capping material 138 to allow replacement or refurbishment of the RFID tag 132, as desired. In one example, a silicone-containing capping material or urethane-containing capping material is contemplated. In one example, the capping material is an epoxy. Examples of capping material include but are not limited to: RTV-HIGH TEMP (26B) (a silicone-containing capping material), ELLSWORTH EP1305 (an epoxy-containing capping material), and LOC-TITE EA E-30CL (an epoxy-containing capping material).

In one example, RTV-HIGH TEMP (26B) includes the following composition: 40-70 wt-% poly (diemthlysiloxane), hydroxy terminated; 7-13 wt-% amorphous silica; 3-7 wt-% petroleum distallates; 1-5 wt-% iron oxide; 1-5 wt-% methyltriacetoxysilane; 1-5 wt-% ethyltriacetoxysilane; and 1-5 wt-% titanium dioxide. In one example, ELLSWORTH EP1305 is an epoxy. A first compound of the epoxy may include 40-50 wt-% 4-nonylphenol; 30-40 wt-% poly(acrylonitrile-co-butadiene; 10-20 wt-% N-(2-Aminoethyl)piperazine; and 5-10 wt % siloxanes and/or silicones. A second compound of the epoxy may include 70-80 wt-% bisphenol-A-(epichlorohydrin) epoxy resin; 10-20 wt-% 1, 2, 3-propanetriyl ester of 12-(oxiranylmethoxy-9-octadecanoic acid; 2.5-5 wt-% siloxanes and/or silicones; and 0.1-1 wt-% carbon black.

While FIGS. 1A-1E illustrate one embodiment of an elevator 100, other embodiments are also contemplated. In another embodiment, it is contemplated that the RFID tag 132 may be embedded in a location other than the upper rib extension 130a. For example, it is contemplated that the RFID tag 132 may be embedded in another part of the door 104, or in the body 102. The location of the RFID tag 132 may be selected to allow for easy scanning of the RFID tag 132 with an RFID tag reader.

Figure 2A:
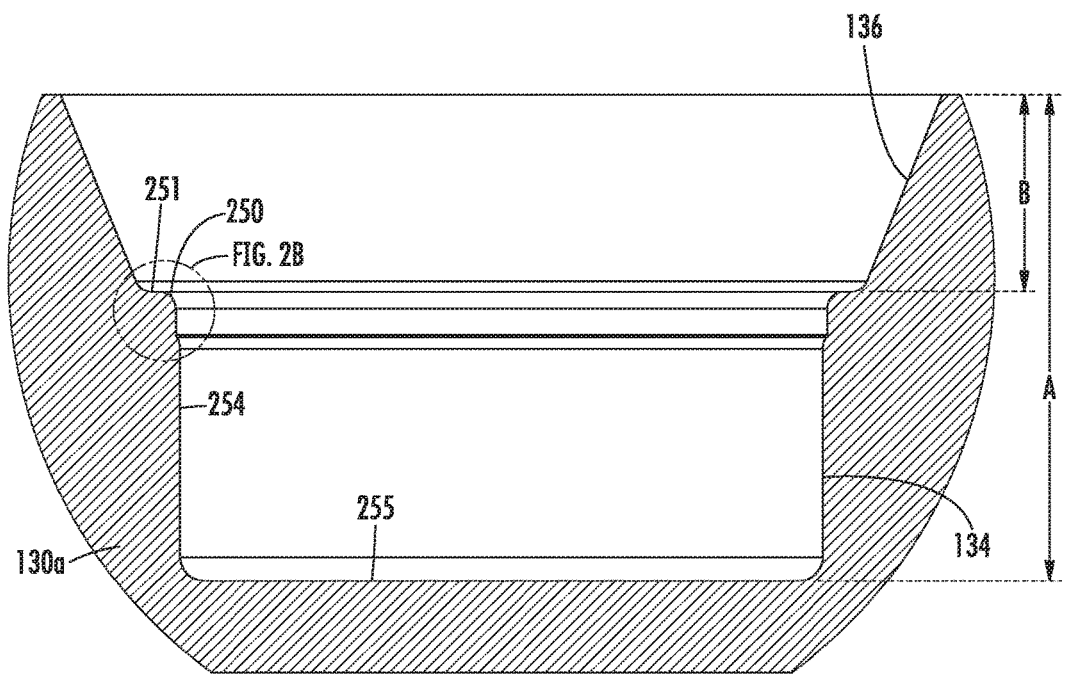
FIG. 2A illustrates an enlarged schematic view of a bore prior to installation of an RFID tag, according to one embodiment of the disclosure.
Figure 2B:
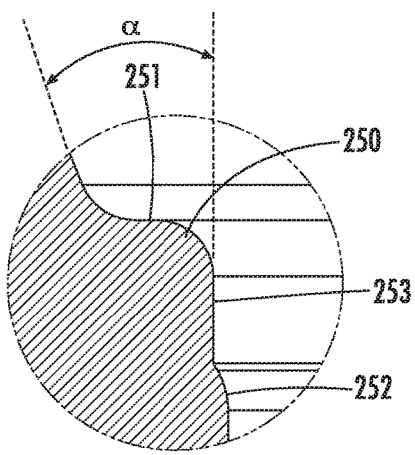
FIG. 2B illustrates an enlarged view of FIG. 2A.
Figure 2C:
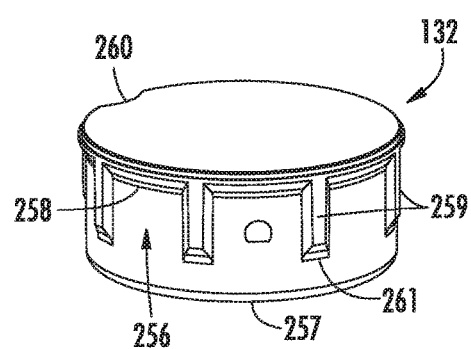
FIG. 2C illustrates an RFID tag prior to installation in a bore, according to one embodiment of the disclosure.

FIG. 2A illustrates an enlarged schematic view of a bore 134 prior to installation of an RFID tag 132. FIG. 2B illustrates an enlarged view of FIG. 2A. FIG. 2C illustrates an RFID tag 132 prior to installation in the bore 134. To facilitating understanding, FIGS. 2A-2C will be explained in conjunction.

As described the above, the bore 134 may extend to a depth A within the upper rib extension 130a, while the countersink 136 may extend to a depth B. The countersink 136 transitions to the bore 134 at an upper shoulder 250. The upper shoulder 250 may include a horizontal surface 251 extending between a sidewall of the countersink 136 and a sidewall of the bore 134. The width of the countersink 136 at the intersection of the horizontal surface 251 may be about 10 millimeters to about 11 millimeters. The width of the countersink 136 at an upper end thereof may be about 12.5 millimeters to about 13.5 millimeters. The horizontal surface 251 may have a width within a range of about 0.2 millimeters to about 1 millimeter, such as about 0.5 millimeters. The radius of curvature of the upper shoulder 250 may be within a range of about 0.1 millimeters to about 0.5 millimeters, such as about 0.25 millimeters. A spot-face may optionally be formed adjacent the countersink 136, however, the spot-face is not shown in FIG. 2A for clarity.

A lower shoulder 252 is positioned radially inward and below the upper shoulder 250. The lower shoulder may have a radius of curvature within a range of about 0.1 millimeters to about 0.5 millimeters, such as about 0.35 millimeters. The lower shoulder 252 may be spaced about 0.25 millimeters to about 1 millimeter from the upper shoulder 250, such as about 0.65 millimeters. A vertical sidewall 253 extends between the upper shoulder 250 and the lower shoulder 252 and defines a counterbore. The walls of the countersink 136 may be formed at an angle alpha relative to the vertical sidewall 253, such as about 15 degrees to about 35 degrees. In one example, the angle alpha is 22 degrees. The height of the vertical sidewall 253 may be about 0.2 millimeters to about 1 millimeters, such as about 0.6 millimeters. A second vertical sidewall 254 is positioned below the lower shoulder 252, and extends to a bottom 255 of the bore 134. Thus, due to the position of shoulders 250, 252, the bore 134 and the counter bore 136 define multiple diameters, wherein the lower diameter is less than the upper diameter. In one example, the lower diameter may within a range of about 9 millimeters to about 10 millimeters, such as about 9.4 millimeters. The upper diameter (e.g., the diameter of the counterbore) may be within a range of about 9 millimeters to about 10 millimeters, such as about 9.6 millimeters.

The multiple diameters of the bore 134 and counter bore 136 facilitate proper seating of the RFID tag 132 via formation of an interference fit, as well as improving axial alignment of the RFID tag. The RFID tag 132 includes a body 256 having a lower shoulder 257, an upper shoulder 258, and a plurality of ribs 259 (two are labeled) running axially along an outer surface of the body 256. The ribs 259 may be equally spaced about the circumference of the body 256, for example, about every 30 degrees to about every 40 degrees, and may connect with the upper shoulder 258. The ribs 259 may extend partially along the axial length of the body 256, such as about 50 percent to about 80 percent along the length, and include a tapered lower surface 261 to facilitate guidance of the RFID tag 132 into the bore 134. In one example, the body 256 has an axial length about 3 millimeters to about 4 millimeters, such as about 3.5 millimeters.

The diameter of ribs 259 on opposite sides of the body 256 is greater than the diameter of the second vertical sidewall 254 of the bore 134. However, the diameter of the body 256 is less than the diameter of the vertical sidewall 254. As the RFID tag 132 is positioned in the bore 134, an interference fit occurs between the bore 134 and the ribs 259, thus maintaining the RFID tag 132 in the bore 134, even in the absence of an adhesive or cover material. Elimination of an adhesive improves the transmitting qualities of the RFID tag 132 by reducing signal interference. To facilitate insertion and seating of the RFID tag 132 in the bore 134, the RFID tag 132 may include an axial recess 260 in the body 256 to allow the escape of gas from beneath the RFID tag 132, thus allowing complete seating of the RFID tag 132 against the bottom 255 of the bore 134. In the seated position, a lower surface of the upper shoulder 258 of the RFID tag 132 may engage the upper shoulder 250 of the bore 134. In some examples, a fluid-tight seal may be formed between the RFID tag 132 and the shoulder 250.

While the embodiments of FIGS. 2A-2C describe installation of an RFID tag without the use of an adhesive, it is contemplated that an adhesive may be used in addition to the interference to further secure the RFID tag 132 in the bore 134.

FIG. 3A illustrates a partial schematic view of an upper rib extension 330a having a bore 134 formed therein, according to another embodiment. FIG. 3B illustrates an enlarged partial view of FIG. 3A. The upper rib extension 330a is similar to the upper rib extension 130a, and may be used in place thereof. However, the upper rib extension 330a lacks a countersink. Thus, the upper shoulder 250 transitions between a vertical sidewall 253 and a lower surface of the spot-face 139. Due to exclusion of a countersink, the bottom surface of the bore 134 may be formed about 4 millimeters to about 5 millimeters, such as about 4.6 millimeters, from an upper surface 361 of the upper rib extension 330a. In one example, the spot-face 139 may have a depth of about 0.2 millimeters to about 0.6 millimeters, such as about 0.4 millimeters. The upper rib extension 330a may accept an RFID tag as similar described above.

FIGS. 4A and 4B illustrate views of a treated bore 470 and an untreated bore 472, respectively, according to one embodiment of the disclosure. The treated bore 470 has been tapped to create thread-form features 471 on an internal surface of the bore 134. For example, the thread-form features 471 may be formed on the second vertical sidewall 254 illustrated in FIG. 3A. The thread-form features 471 interact with the ribs 259 of an RFID tag 132 (shown in FIG.

2C) to facilitate retention of the RFID tag 132 in the bore 134 via an improved interference fit. For example, the thread-form features 471 are approximately perpendicular to ribs 259 as the RFID tag 132 is inserted into the bore 134. During insertion, the ribs 259, which are formed of a softer material than the thread-form features 471, elastically deform. Specifically, the ribs 259 compress at the thread-form features 471, and expand between the crests of the thread-form features 471. In one example, the thread-form feature 471 may include about 2 to about 4 threads in the bore.

In contrast, the untreated bore 472 lacks thread-form features and has relatively smooth surfaces resulting from a bore formation process, such as drilling or milling. The relatively smooth surfaces of the untreated bore 472 do not secure an RFID tag as well as the treated bore 470. In addition, the treated bore 470 facilitates removal of an RFID tag in the event the RFID tag requires replacement. Due to presence of the thread-form features 471, an RFID tag may be engaged by a tool bit unscrewed, greatly simplifying the removal process.

Figure 5A:
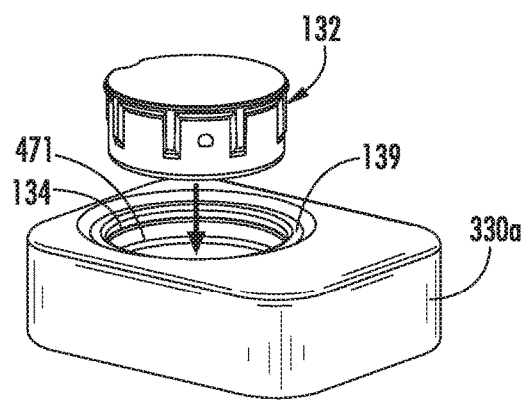
FIGS. 5A-5E illustrate an installation process for an RFID tag, according to one embodiment of the disclosure.
Figure 5B:
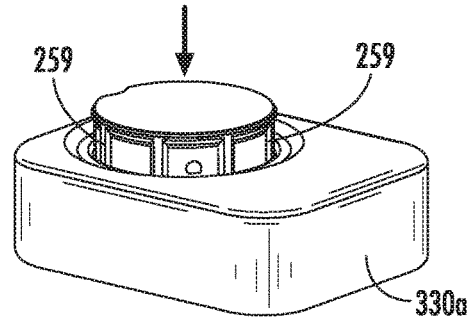
Figure 5C:
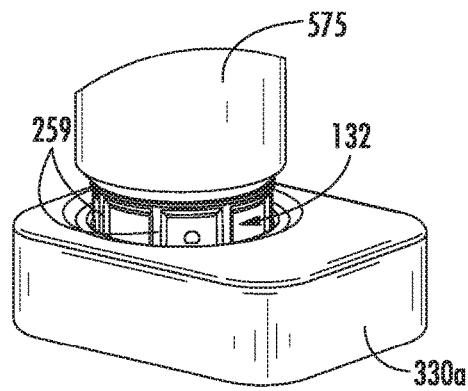
Figure 5D:
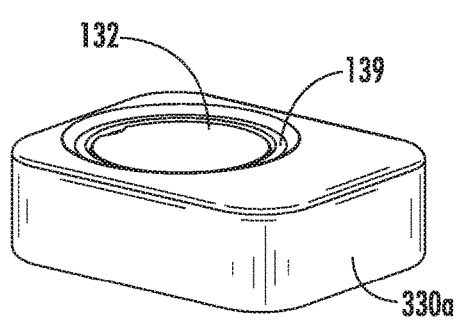

FIGS. 5A-5E illustrate an installation process for an RFID tag 132, according to one embodiment of the disclosure. FIG. 5A illustrates an upper rib extension 330a of an elevator after formation and treating of a bore 134. As described above, a spot-face 139 may be formed in the upper rib extension 330a (partially illustrated) to provide a planar and/or uniform reference surface for further machining, such as drilling or milling. Subsequently, the bore 134 may be formed, for example via drilling, and then tapped to form thread-form features 471 on the second vertical sidewalls 254 (shown in FIG. 3A) of the bore 134. An optional corrosion-inhibitor may then be applied to the exposed surfaces. An RFID tag 132 is then be positioned proximate to the bore 134, as shown in FIG. 5A. Once axially aligned, the RFID tag 132 may be lowered into the bore 134, as shown in FIG. 5B.

The RFID tag 132 is lowered until the tapered lower surfaces 261 (shown in FIG. 2C) of the ribs 259 (two are labeled) engage an upper shoulder 250 (shown in FIG. 3A) of the counterbore. Contact of all or most of the ribs 259 with the upper should 250 indicates axially alignment and proper positioning of the RFID tag 132 with respect to the bore 134, thereby reducing or preventing damage to the RFID tag 132 during installation. Subsequently, the RFID tag 132 is driven into the bore 134 by a driving tool 575. The driving tool 575 may be a cylindrical rod having a planar surface on a lower end thereof to engage the RFID tag 132 and apply even pressure while driving the RFID tag 132 into the upper rib extension 330a. The RFID tag 132 may be manually or mechanically driven into the bore 134. As the RFID tag 132 is driven into the bore 134, the ribs 259 engage the thread-form features 471 to create an interference fit, thus maintaining the RFID tag 132 in the bore 134 without the use of an adhesive.

Figure 5E:
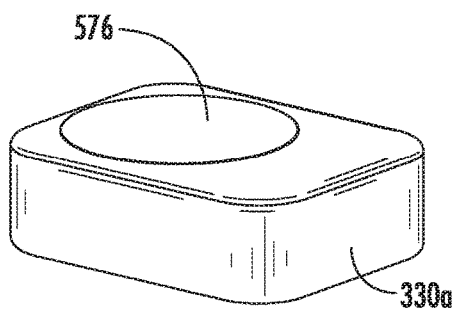

The RFID tag 132 is driven until the RFID tag contacts the bottom surface 255 (shown in FIG. 3A) of the bore 134. Gas escapes from beneath the RFID tag via an axial recess 260, thus allowing complete seating of the RFID tag 132 within the bore 134. Additionally, in the seated configuration, an upper shoulder 258 of the RFID tag 132 engages the upper shoulder 250 of the bore 134, forming a seal therebetween. The upper shoulder 258 is thus positioned proximate to the sidewall 253 defining the counterbore. In one example, the upper surface of the RFID tag 132 is co-planar with or recessed below a lower surface of the spot-face 139 when fully seated. During installation, the RFID tag 132 may be oriented to maximize transmission/read range of the RFID tag 132. Subsequently, as illustrated in FIG. 5E, an optional capping layer 576 may be applied over the RFID tag 132 to seal, protect, and/or secure the RFID tag in the upper rib extension 330a. The capping layer 576 may be substantially coplanar with the upper surface of the upper rib extension 330a. Although not illustrated, it is to be understood that an RFID tag 132 is seated in an upper rib extension 130a in a similar manner.

While embodiments herein refer to placement of the RFID tags in elevators, it is contemplated that methods described herein may be applicable to other equipment in addition to elevators. Examples of other equipment which may benefit from embodiments herein include elevator links, bushings, power slips, drill pipe slips, casing slips, drill collar slips, tubing spiders, casing spiders and reducer bushings, flush mounted spiders, slip lifters, safety clamps, Kelly spinners, rotating mouse hole tools, pipe spinners, tubing tongs, drill pipe tongs, casing tongs, beckets, stabbing guides, casing scrapers, torque tools, power tongs, master bushings, inserts bowls, bowl adapters, and the like. Additionally, while one example of an elevator is illustrated, it is contemplated that other types of elevators may benefit from embodiments described herein, including solid body elevators, multi-pipe elevators, hydraulic-operated elevators, air-operated elevators, manual elevators, side door elevators, slip-type elevators, combination elevator/spider tools, and single joint elevators.

Figure 6A:
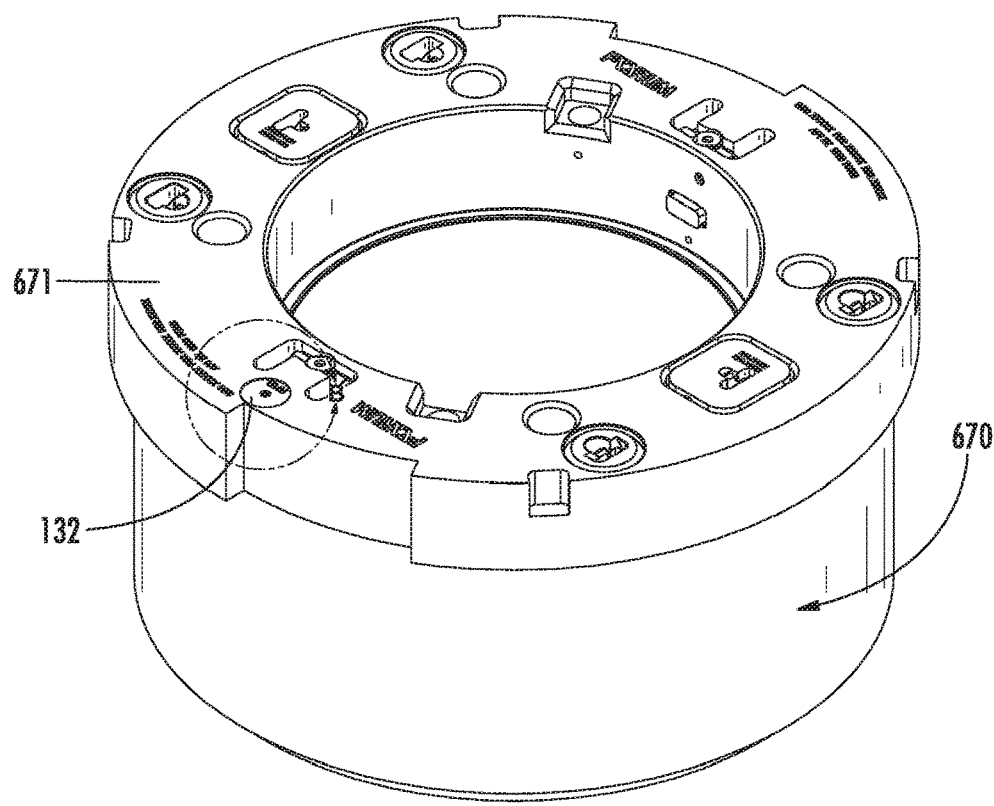
FIG. 6A is a schematic perspective view of a master bushing, according to one embodiment of the disclosure.
Figure 6B:
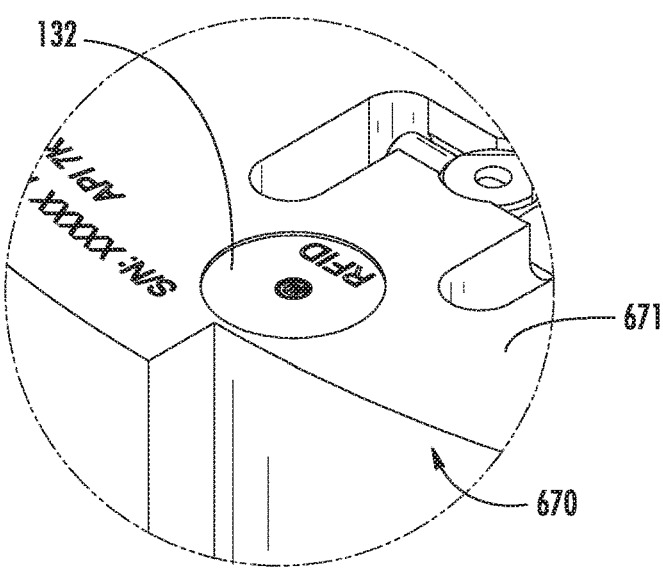
FIG. 6B is an enlarged partial view of FIG. 6A.

FIG. 6A is a schematic perspective view of a master bushing 670, according to one embodiment of the disclosure. FIG. 6B is an enlarged partial view of FIG. 6A. The master bushing 670 is usable with elevators, such as those described herein. In one example, the master bushing 670 may be utilized with the XP1000 Extreme Performance Landing String System available from Forum Energy Technologies of Houston, Tex. The master bushing 670 includes a mounting surface 671 into which an RFID 132 may be embedded, as described above. In such a manner, the master bushing 670 realizes many of the benefits described herein. Other mounting locations on the master bushing 670 are contemplated.

Figure 7A:
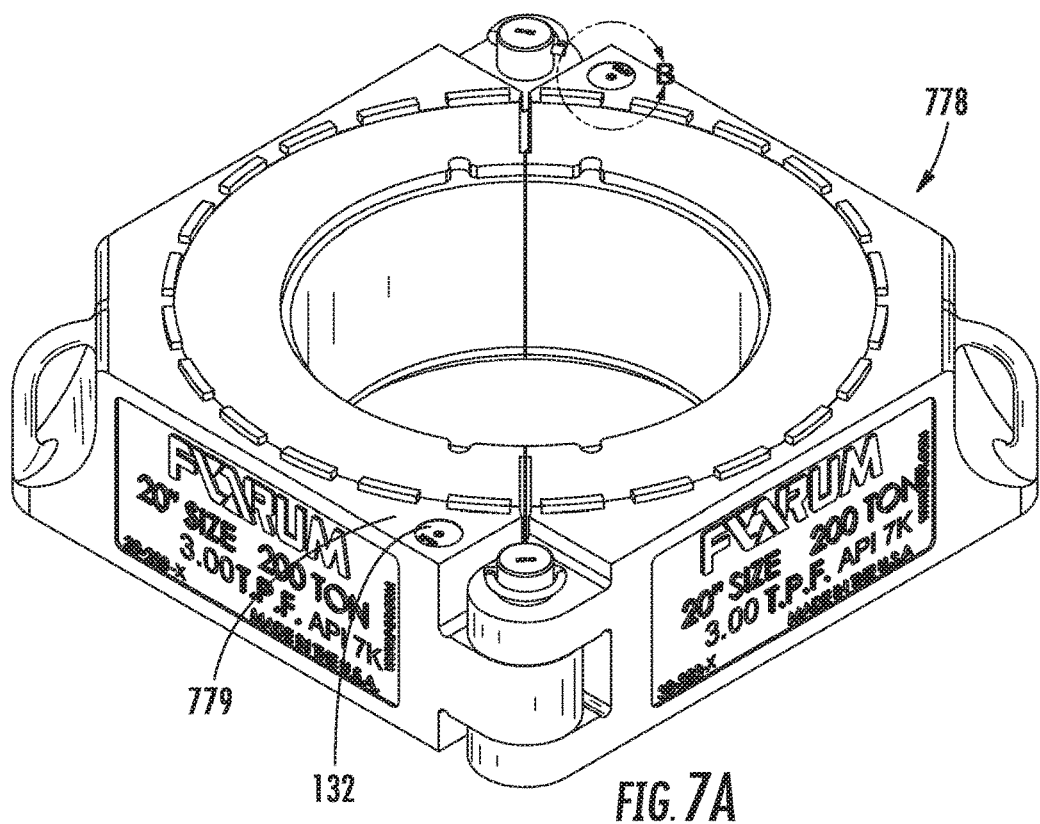
FIG. 7A is a schematic perspective view of a spider, according to one embodiment of the disclosure.
Figure 7B:
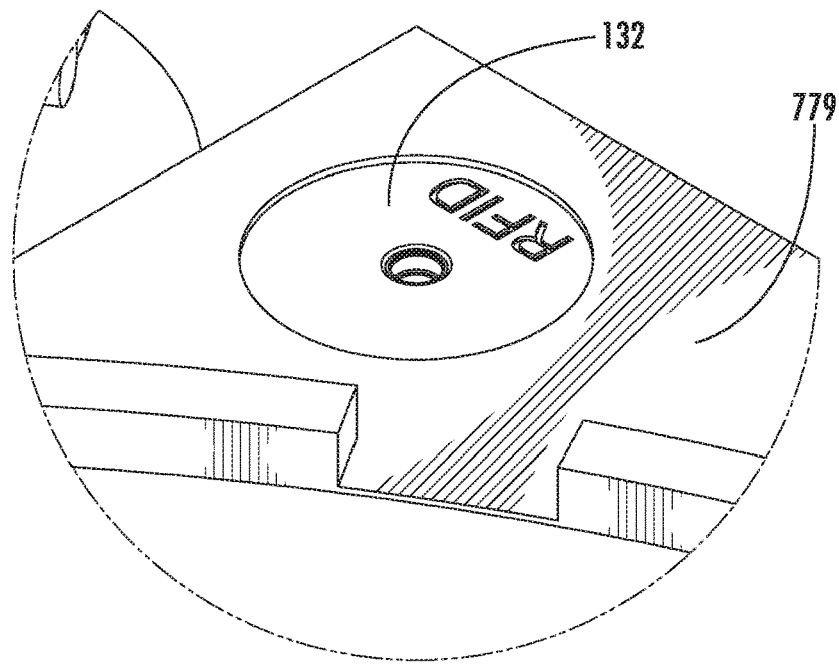
FIG. 7B is an enlarged partial view of FIG. 7A.

FIG. 7A is a schematic perspective view of a spider 778, according to one embodiment of the disclosure. FIG. 7B is an enlarged partial view of FIG. 7A. The spider 778 is a hinged casing spider, and may have an internal diameter of about 2⅜ inches to 30 inches, or more. An exemplary spider 778 is available from Forum Energy Technologies of Houston, Tex. The spider 778 includes a mounting surface 779 in which an RFID tag 132 may be embedded, as described above. In such a manner, the spider 778 realizes many of the benefits described herein. Other mounting locations on the spider 778 are contemplated.

Figure 8A:
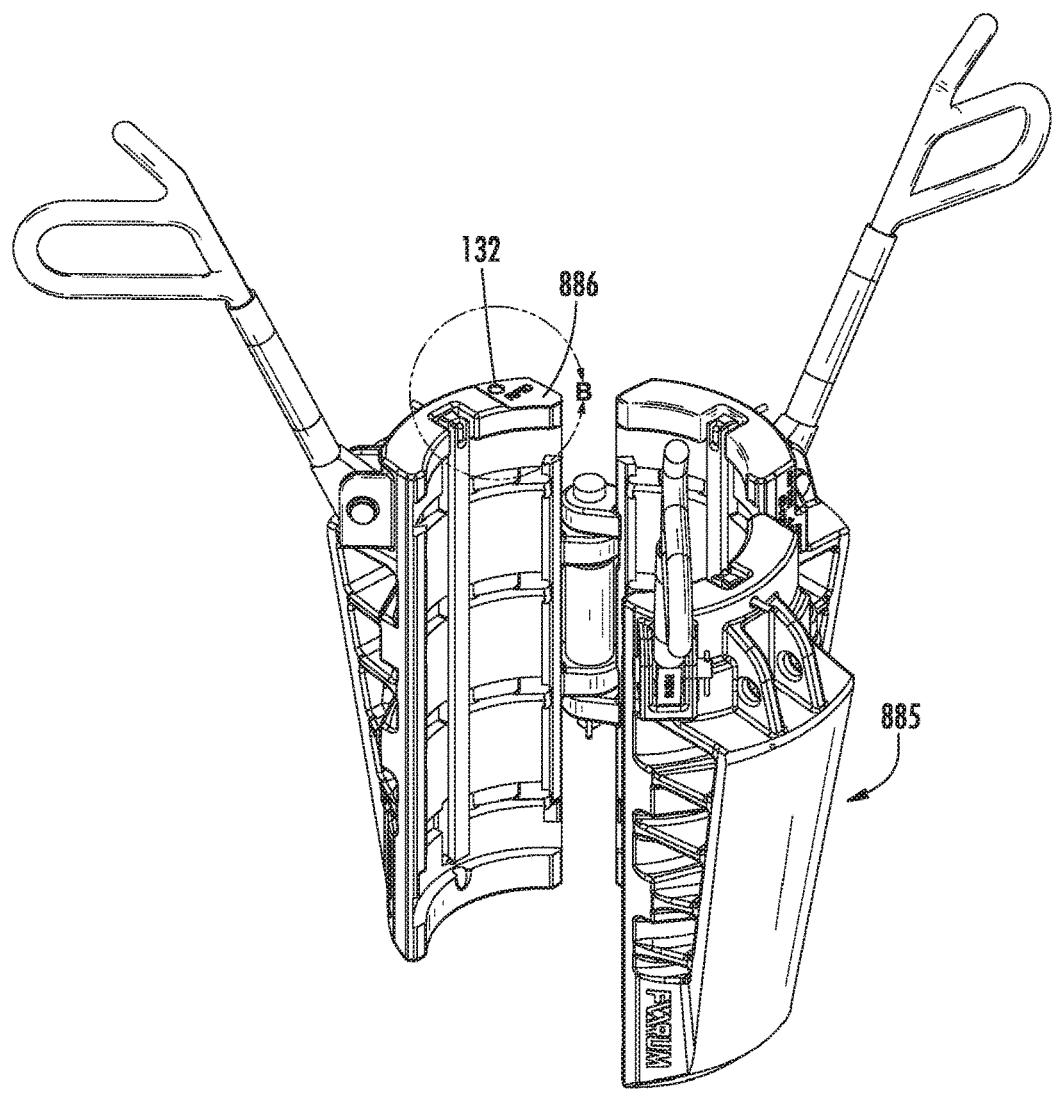
FIG. 8A is a schematic perspective view of a slip, according to one embodiment of the disclosure.
Figure 8B:
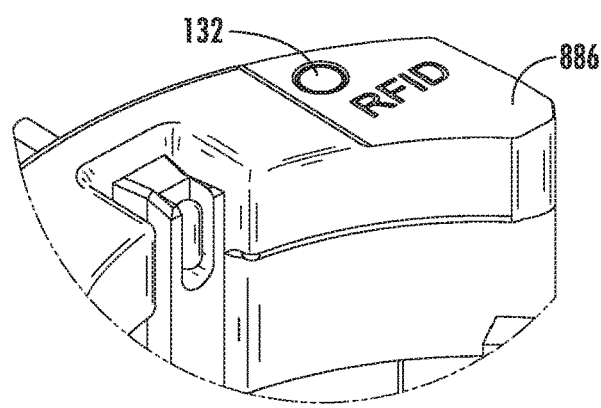
FIG. 8B is an enlarged partial view of FIG. 8A.

FIG. 8A is a schematic perspective view of a slip 885, according to one embodiment of the disclosure. FIG. 8B is an enlarged partial view of FIG. 8A. An exemplary slip 885 is available from Forum Energy Technologies of Houston, Tex. The slip 885 includes a mounting surface 886 into which an RFID tag 132 is embedded. In such a manner, the slip 885 realizes many of the benefits described herein. Other mounting locations on the 885 are contemplated.

Figure 9A:
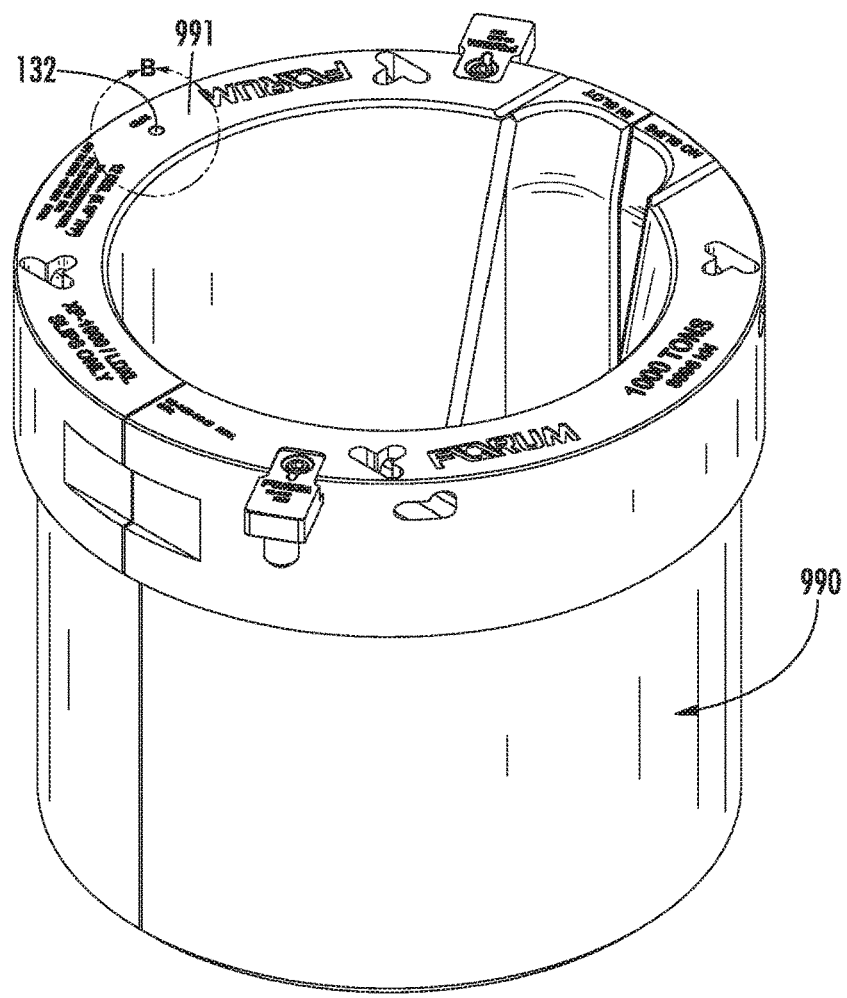
FIG. 9A is a schematic perspective view of a bowl, according to one embodiment of the disclosure.
Figure 9B:
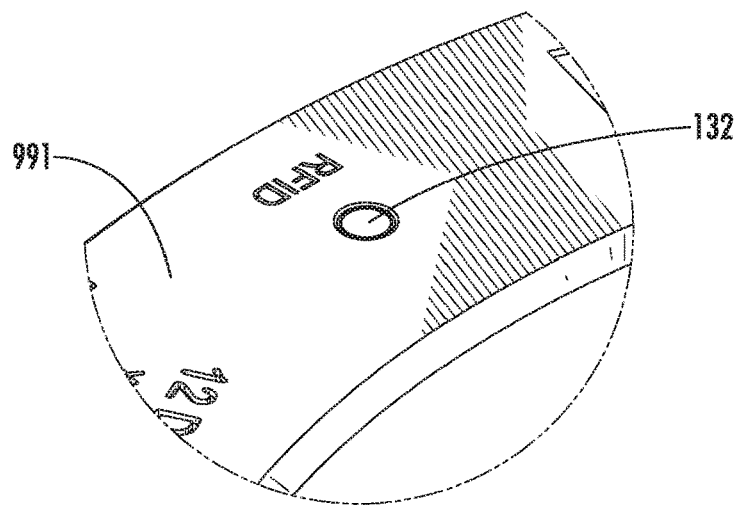
FIG. 9B is an enlarged partial view of FIG. 9A.

FIG. 9A is a schematic perspective view of a bowl 990, according to one embodiment of the disclosure. FIG. 9B is an enlarged partial view of FIG. 9A. The bowl 990 is usable with master bushings, such as those described herein. In one example, the bowl 990 may be utilized with the XP1000 Extreme Performance Landing String System available from Forum Energy Technologies of Houston, Tex. The bowl 990 includes a mounting surface 991 into which an RFID 132 may be embedded, as described above. In such a manner, the bowl 990 realizes many of the benefits described herein. Other mounting locations on the bowl 990 are contemplated.

Figure 10A:
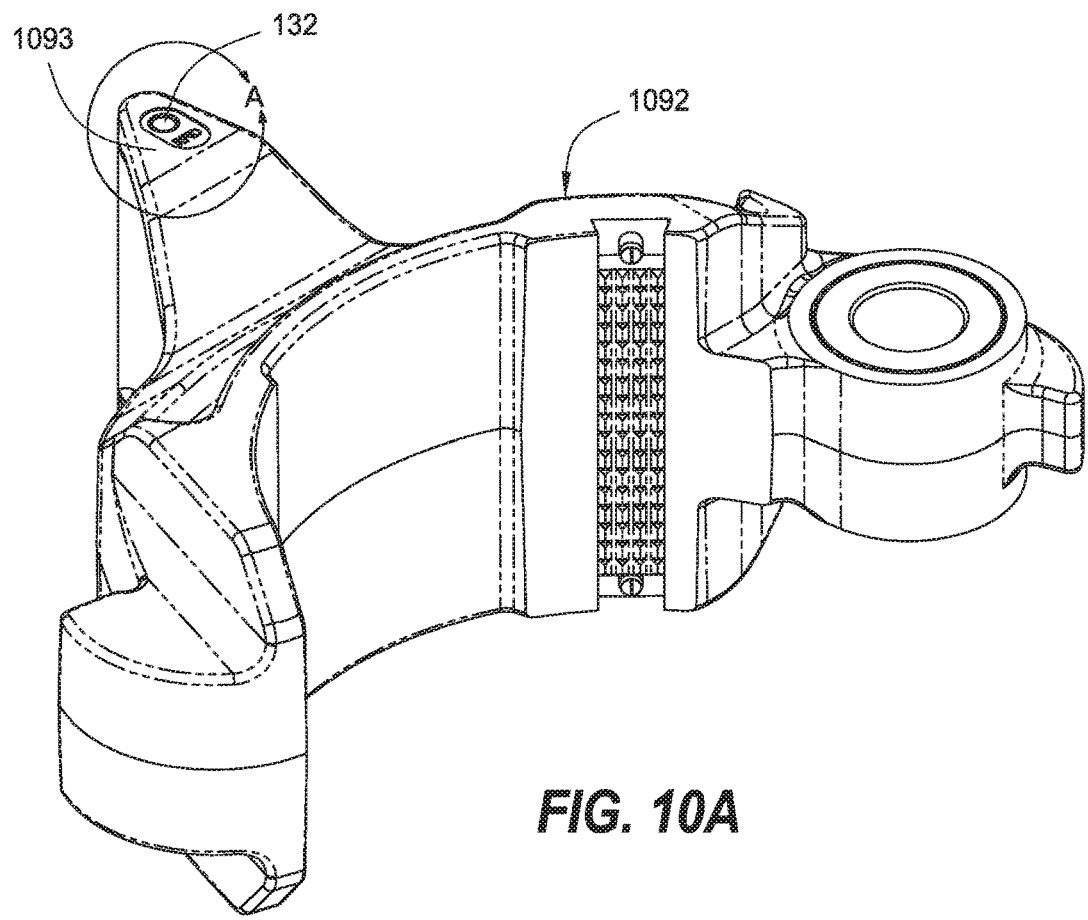
FIG. 10A is a schematic perspective view of a lug jaw, according to one embodiment of the disclosure.
Figure 10B:
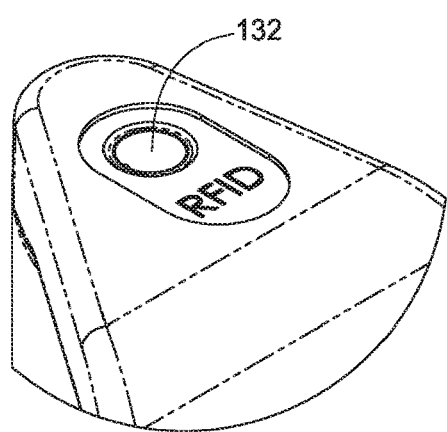
FIG. 10B is an enlarged partial view of a FIG. 10A.

FIG. 10A is a schematic perspective view of a lug jaw 1092, according to one embodiment of the disclosure. FIG. 10B is an enlarged partial view of a FIG. 10A. An exemplary lug jaw 1092 is available from Forum Energy Technologies of Houston, Tex. The lug jaw 1092 includes a mounting surface 1093 into which an RFID tag 132 is embedded. In such a manner, the lug jaw 1092 realizes many of the benefits described herein. Other mounting locations on the lug jaw 1092 are contemplated.

Figure 11A:
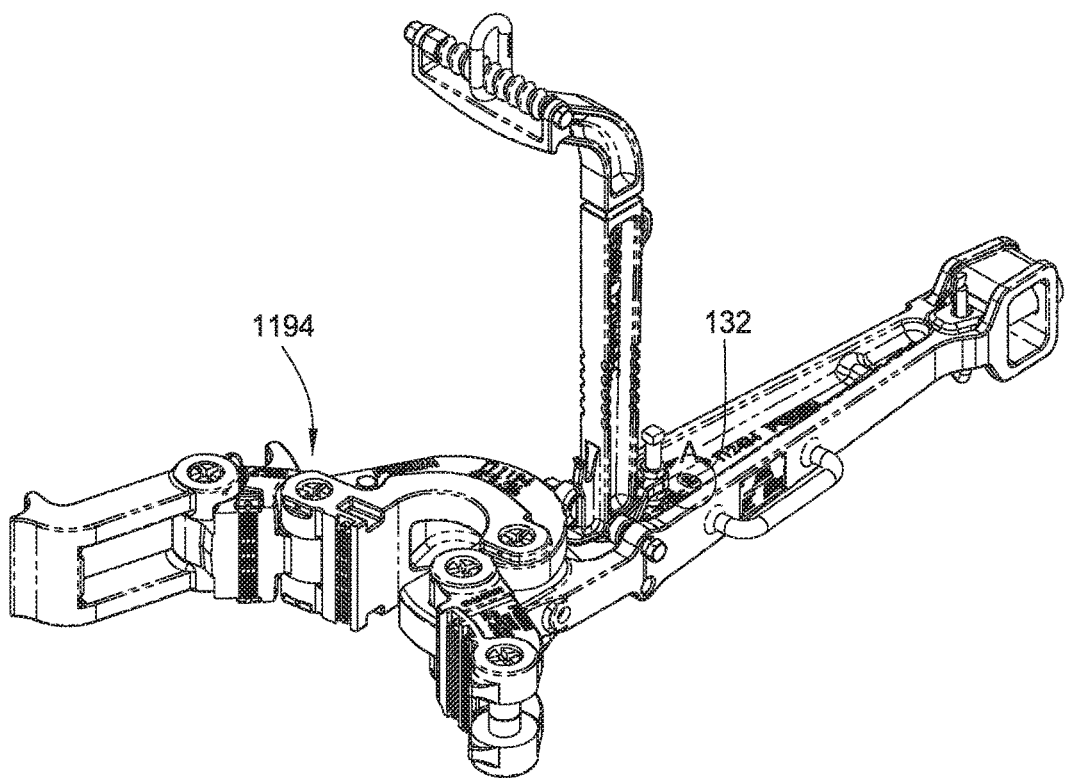
FIG. 11A is a schematic perspective view of tong assembly, according to one embodiment of the disclosure.
Figure 11B:
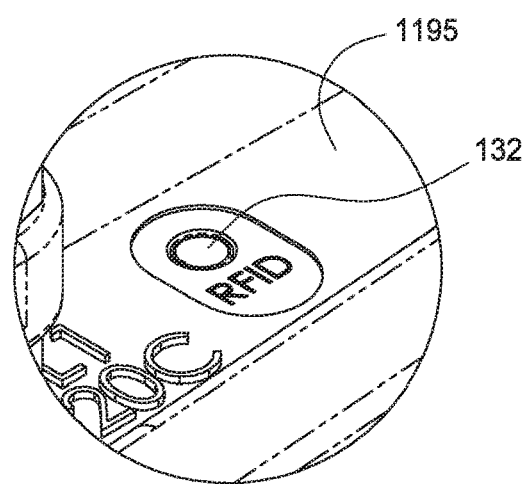
FIG. 11B is an enlarged partial view of a FIG. 11A.

FIG. 11A is a schematic perspective view of tong assembly 1194, according to one embodiment of the disclosure. FIG. 11B is an enlarged partial view of a FIG. 11A. In one example, the lug jaw 1092 may be utilized with the tong assembly 1194. However, it is contemplated that other lug jaws may be utilized with the tong assembly 1194 for as well. An exemplary tong assembly 1194 is available from Forum Energy Technologies of Houston, Tex. The tong assembly 1194 includes a mounting surface 1195 into which an RFID tag 132 is embedded. In such a manner, the tong assembly 1194 realizes many of the benefits described herein. Other mounting locations on the tong assembly 1194 are contemplated.

In some examples, the mounting locations described herein are selected to be areas of low stress when a particular tool is under full load. As such, damage to the RFID tag, or the likelihood of an RFID tag inadvertently coming loose, is minimized while tool integrity is maintained. However, it is contemplated that other areas of the tool may be utilized for securing an RFID tag. For example, it is contemplated that tools may have more than one area of relatively low stress. In one example, the RFID tag is mounted at the spot of lowest stress under full load.

Benefits of the disclosure include expedited and more accurate identification of elevators. Because the elevators utilize RFID tags rather than nameplates to provide a primary method of identification, the disclosed elevators can more easily be identified than conventional elevators. Additionally, the disclosed elevators utilized an embedded RFID tag which is more protected than externally-secured RFID tags. Therefore, the RFID tags of the disclosed elevators are less likely to be unintentionally damaged or removed during operations. In addition, some tools, such as elevators or other equipment, may bear dual load ratings, dependent upon how the tool is dressed and for what style of pipe is being handled. Such tools may lack adequate space to properly identify the dual load ratings. However, the RFID tags of the present disclosure obviate the spacing issues, and facilitate identification of this information by an operator.

While the foregoing is directed to embodiments of the present disclosure, other and further embodiments of the disclosure may be devised without departing from the basic scope thereof, and the scope thereof is determined by the claims that follow.

We claim:

1. An elevator, comprising:
   a body;
   a door pivotably mounted to the body of the elevator, the door and the body of the elevator defining a cylindrical shape when the door is in a closed position;
   an upper rib extension extending from the door, the upper rib extension including a bore, the bore including:
   an upper shoulder;
   a lower shoulder positioned radially inward of the upper shoulder and below the upper shoulder;
   a bottom;
   a first vertical sidewall extending between the upper shoulder and the lower shoulder; and
   a second vertical sidewall extending between the lower shoulder and the bottom;
   a radio frequency identification tag including a body, an upper shoulder, and one or more axial ribs disposed on an outer surface of the body of the radio frequency identification tag, the radio frequency identification tag being embedded in and forming an interference fit with the bore of the upper rib extension such that a surface of the upper shoulder of the radio frequency identification tag engages the upper shoulder of the bore and the radio frequency identification tag contacts the bottom of the bore; and
   a capping material disposed over the radio frequency identification tag to seal the radio frequency identification tag within the bore of the upper rib extension.

2. The elevator of claim 1, wherein the radio frequency identification tag is adapted to provide information related to one or more of make, model number, size rating, load rating, link compatibility, maintenance history, time on location, maintenance and/or inspection requirements, or GPS location.

3. The elevator of claim 1, wherein the capping material comprises at least one of silicone, epoxy, or urethane.

4. The elevator of claim 1, wherein the one or more axial ribs have a diameter greater than a diameter of the bore to form the interference fit between the radio frequency identification tag and the bore.

5. The elevator of claim 4, wherein each of the one or more axial ribs comprises a tapered lower surface configured to guide the radio frequency identification tag into the bore.

6. The elevator of claim 1, wherein the surface of the upper shoulder of the radio frequency identification tag engages the upper shoulder of the bore to form a seal against the upper shoulder of the bore.

7. The elevator of claim 1, wherein the body of the radio frequency identification tag comprises an axial recess.

8. A tool, comprising:
   a body, the body of the tool comprising a bore, the bore including:
   an upper shoulder;
   a lower shoulder positioned radially inward of the upper shoulder and below the upper shoulder;
   a bottom;
   a first vertical sidewall extending between the upper shoulder and the lower shoulder; and
   a second vertical sidewall extending between the lower shoulder and the bottom;
   a radio frequency identification tag including a body, an upper shoulder, and one or more axial ribs disposed on an outer surface of the body of the radio frequency identification tag, the radio frequency identification tag being embedded into and forming an interference fit with the bore of the body of the tool such that a surface of the upper shoulder of the radio frequency identification tag engages the upper shoulder of the bore and the radio frequency identification tag contacts the bottom of the bore, wherein the radio frequency identification tag is adapted to provide information related to one or more of make, model number, size rating, load rating, link compatibility, maintenance history, time on location, maintenance and/or inspection requirements, or GPS location; and a capping material disposed over the radio frequency identification tag to seal the radio frequency identification tag within the bore of the body of the tool.

9. The tool of claim 8, wherein the capping material comprises at least one of silicone, epoxy, or urethane.

10. The tool of claim 8, wherein the tool comprises one or more of an elevator link, a bushing, a power slip, a drill pipe slip, a casing slip, a drill collar slip, a tubing spider, a casing spider, a reducer bushing, a flush mounted spider, a slip lifter, a safety clamp, a Kelly spinner, a rotating mouse hole tool, a pipe spinner, a tubing tong, a drill pipe tong, a casing tong, a becket, a stabbing guide, a casing scraper, a torque tool, a power tong, a master bushing, an inserts bowl, a bowl adapter, a solid body elevator, a multi-pipe elevator, a hydraulic-operated elevator, an air-operated elevator, a manual elevator, a side door elevator, a slip-type elevator, a combination elevator/spider tool, or a single joint elevator.

11. The tool of claim 8, wherein the bore comprises thread-form features configured to increase the interference fit with the radio frequency identification tag.

12. The tool of claim 8, wherein the one or more axial ribs have a diameter greater than a diameter of the bore to form the interference fit between the radio frequency identification tag and the bore.

13. The tool of claim 12, wherein each of the one or more axial ribs comprises a tapered lower surface configured to guide the radio frequency identification tag into the bore.

14. The tool of claim 8, wherein the surface of the upper shoulder of the radio frequency identification tag engages the upper shoulder of the bore to form a seal against the upper shoulder of the bore.

15. The tool of claim 8, wherein the body of the radio frequency identification tag comprises an axial recess.

16. A tool, comprising:
a body of the tool, the tool comprising an elevator, a spider, a master bushing, a bowl, or a slip, and the body of the tool including a bore, the bore including:
an upper shoulder;
a lower shoulder positioned radially inward of the upper shoulder and below the upper shoulder;
a bottom;
a first vertical sidewall extending between the upper shoulder and the lower shoulder; and
a second vertical sidewall extending between the lower shoulder and the bottom;
a radio frequency identification tag including a body, an upper shoulder, and one or more axial ribs disposed on an outer surface of the body of the radio frequency identification tag, the radio frequency identification tag being embedded into and forming an interference fit with the bore of the body of the tool such that a surface of the upper shoulder of the radio frequency identification tag engages the upper shoulder of the bore and the radio frequency identification tag contacts the bottom of the bore, wherein the radio frequency identification tag is adapted to provide information related to one or more of make, model number, size rating, load rating, link compatibility, maintenance history, time on location, maintenance and/or inspection requirements, or GPS location; and
a capping material disposed over the radio frequency identification tag to seal the radio frequency identification tag within the bore of the body of the tool.

17. The tool of claim 16, wherein the capping material comprises at least one of silicone, epoxy, or urethane.

18. The tool of claim 16, wherein the bore comprises thread-form features configured to increase the interference fit with the radio frequency identification tag.

19. The tool of claim 16, wherein the one or more axial ribs have a diameter greater than a diameter of the bore to form the interference fit between the radio frequency identification tag and the bore.

20. The tool of claim 19, wherein each of the one or more axial ribs comprise a tapered lower surface configured to guide the radio frequency identification tag into the bore.

21. The tool of claim 16, wherein the surface of the upper shoulder of the radio frequency identification tag engages the upper shoulder of the bore to form a seal against the upper shoulder of the bore.

22. The tool of claim 16, wherein the body of the radio frequency identification tag comprises an axial recess.

* * * * *